United States Patent [19]

Iwasaki

[11] 4,344,331

[45] Aug. 17, 1982

[54] FLUID FLOW METER

[75] Inventor: Shinichiro Iwasaki, Auburn Heights, Mich.

[73] Assignee: Aisin Seiki Company, Limited, Kariya, Japan

[21] Appl. No.: 182,585

[22] Filed: Aug. 29, 1980

[51] Int. Cl.³ ............................................. G01F 1/28
[52] U.S. Cl. .................................. 73/861.76; 324/208
[58] Field of Search ........... 73/861.53, 861.56, 861.71, 73/861.74, 861.75, 861.76; 336/30; 117–120, 128; 324/208; 340/870.33

[56] References Cited

U.S. PATENT DOCUMENTS

| | | | |
|---|---|---|---|
| 3,153,935 | 10/1964 | Karlson | 73/722 |
| 3,168,830 | 2/1965 | Chass . | |
| 3,480,854 | 11/1969 | Jaquith et al. . | |
| 3,855,528 | 12/1974 | Brown . | |
| 3,877,314 | 4/1975 | Bernin . | |
| 4,013,911 | 3/1977 | Fujiwara et al. . | |
| 4,073,189 | 2/1978 | Draper | 73/861.76 |
| 4,140,971 | 2/1979 | Blincoe . | |
| 4,254,664 | 3/1981 | Graham | 73/861.58 |
| 4,258,279 | 3/1981 | Hovorka . | |
| 4,284,916 | 8/1981 | Onodera et al. . | |
| 4,286,188 | 8/1981 | Honsinger et al. . | |

FOREIGN PATENT DOCUMENTS

| | | | |
|---|---|---|---|
| 2509447 | 9/1976 | Fed. Rep. of Germany ... | 73/861.74 |
| 909023 | 10/1962 | United Kingdom . | |
| 445834 | 5/1975 | U.S.S.R. ............................ | 73/861.57 |

OTHER PUBLICATIONS

Mohri et al.–"Force and Displacement Transducers"–*Electrical Engineering in Japan*–vol. 99, No. 2, pp. 105–112, Feb. 1979.

*Primary Examiner*—Charles A. Ruehl
*Attorney, Agent, or Firm*—Oblon, Fisher, Spivak, McClelland & Maier

[57] ABSTRACT

A fluid flow meter comprised of a body portion having a passage therein for the fluid to flow therethrough, a movable member provided in the passage and adapted to be tiltable to open or close throttling of the passage corresponding to the flow rate of the fluid flowing through the passage, a spiral spring biasing the movable member constantly in the direction of throttling the passage, an amorphous magnetic member fixed to the movable member and provided with coils wound thereon, and a solenoid wound on the body portion to generate magnetic flux that is substantially parallel to the direction of fluid flow.

12 Claims, 12 Drawing Figures

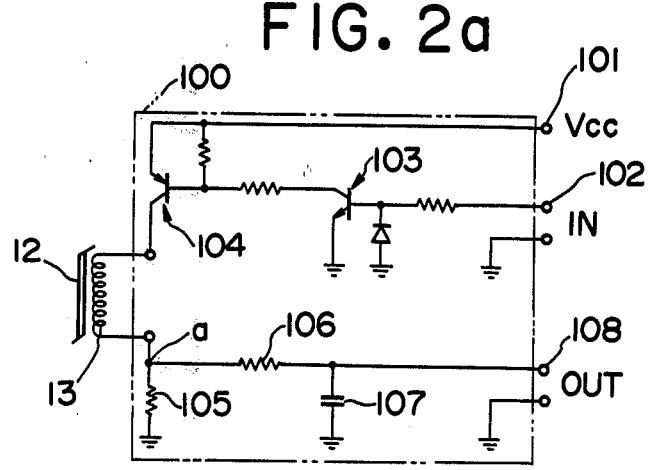
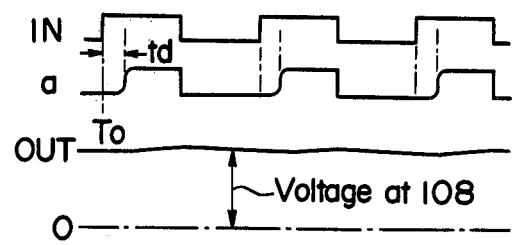
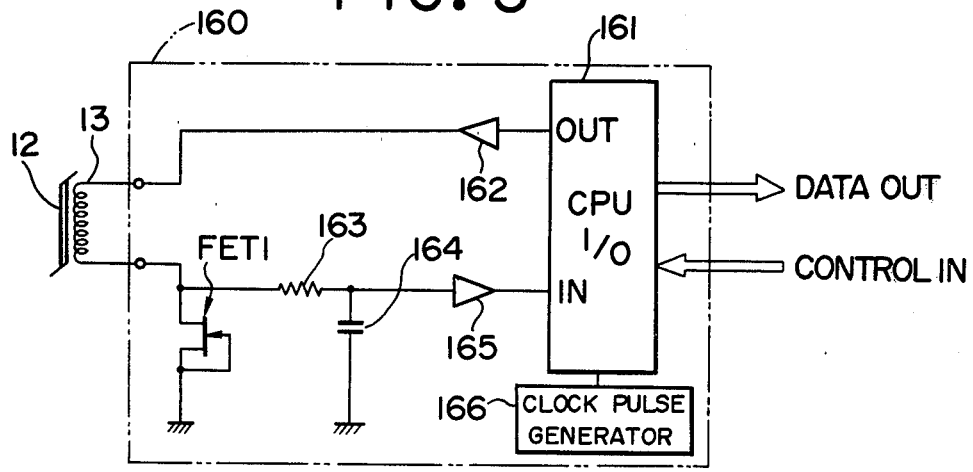

FLUID FLOW METER

BACKGROUND OF THE INVENTION

1. Field of the Invention

The present invention relates to a fluid flow meter, and in particular to the type of flow meter in which the fluid flow is directed to a movable member and displacement of the movable member is transformed into an electrical signal.

2. Description of the Prior Art

One conventional flow meter is provided with a movable member which receives a dynamic pressure by the flow of a fluid, a spiral spring biasing the movable member in a direction opposite to the dynamic pressure created by the flow of the fluid and a potentiometer with a slider connected to the movable member. The movable member is displaced an amount which corresponds to the amount of dynamic pressure created thereon and an analog voltage corresponding to the displacement of the movable member is obtained from the potentiometer. In this type of flow meter, it is desirable that the thin membrane resistance of the potentiometer be highly resistant against abrasion, the level of the output voltage for the position of the slider be stable, and furthermore, the looseness in the connection mechanism between the movable member and the slider be small and the contact between the slider and the membrane resistance also be stable even against vibration and shock.

However, contact between the slider and the membrane resistance in the potentiometer is of pressure contact. Consequently, over a period of time, an unstable output pressure will be caused relative to the dynamic pressure by the flow of fluid due to abrasion vibration and other causes.

SUMMARY OF THE INVENTION

Therefore, the primary object of the present invention is to provide a fluid flow meter adapted to transform the mechanical displacement of a movable member into an electrical signal, having no mechanical contacting mechanism in the mechanical-to-electrical transformation system and provided with a transforming means having no-contacting mechanism.

The second object of the present invention is to provide a fluid flow meter having the desirable properties of resistance against vibration and shock and being of rigid construction.

The third object of the present invention is to provide a flow meter wherein it is relatively simple to electrically process the flow rate detection signal.

The fourth object of the present invention is to provide a flow meter which makes it possible to read the flow rate data with a relatively simple read logic by means of LSI used in a microcomputer and so forth.

According to the present invention, a passage is formed in a casing through which flows the fluid of which flow rate is to be detected and inside the space provided in the casing a magnetically soft member with an electrical coil wound thereon is pivotably fixed at one end and the magnetically soft member is biased with the pivot as the rotational center by a spiral spring in the direction across the passage. In the casing, with the magnetically soft member pivoted thereto, is provided a magnetic field generation means (for example a permanent magnet or solenoid) with the pivot as the center. The solenoid is energized to form a magnetic field parallel to the flow of fluid in the passage.

The area of the cross-section of the magnetically soft member is made small so as not to generate magnetic saturation and the number of windings of the electrical coil is selected so that the magnetically soft member will be sufficiently magnetically saturated at a relatively low impressed voltage that is of a relatively low energizing current.

Assuming that T is the time required from the starting point of impressing with voltage the electrical coil wound on the magnetically soft member to the magnetic saturation of the magnetic member, the following formula will be applied in general:

$$T = N/E \cdot (\phi m - \phi x) \quad (1)$$

where;

E: Impressing voltage applied to the electrical coil
N: Number of windings of the electrical coil
$\phi m$: Maximum magnetic flux (saturation flux)
$\phi x$: Magnetic flux by external magnetic field.

Accordingly, as the magnetic flux $\phi x$ imposed on the magnetically soft meter varies in accordance with the variation of the slanting angle in the magnetic field generated by the solenoid, T will also vary correspondingly. That is to say, the magnetically soft member rotates around the pivoting point depending on the dynamic pressure created by the flow of fluid and the projected area of the magnetically soft member in the direction of the magnetic flux will vary whereby the time required, from the impression of the coil by voltage to the coil current reaching the specified level, will be varied. For this reason, the fluid flow meter according to the present invention is connected to an electrical circuit or a semiconductor electronic device which will first detect T and indicate it in the form of electrical signals such as voltage level, digital codes, etc. In the preferred embodiment of the present invention, the magnetically soft member is made of an amorphous magnetic material. The amorphous magnetic material is of such a thin plate that it can only be made by quickly quenching a liquid phase metal. The magnetically soft member is ferromagnetic from a magnetic point of view and has high magnetic permeability and saturation magnetization, low coercive force and excellent flexibility and restoring properties. Such characteristics of the amorphous magnetic material, as mentioned above, are highly desirable for the fluid flow meter according to the present invention and by applying such desirable characteristics, advantages will be obtained in which the signal processing in the measurement of T can be made simple and precise and manufacturing can be made simple and resistance against vibration and shocks can be improved.

BRIEF DESCRIPTION OF THE DRAWINGS

Additional objects and advantages of the present invention will be more readily apparent from the following detailed description of a preferred embodiment thereof when taken together with the accompanying drawings in which:

FIG. 1b is a sectional view taken along line B—B of FIG. 1a;

FIG. 2a is a circuit diagram showing an electrical circuit which is connected to the fluid flow meter shown in FIG. 1a–1c and which generates an analog voltage of a level corresponding to a detected flow rate;

FIG. 2b is a waveform diagram indicating the input and output signals of the electrical circuit shown in FIG. 2a;

FIG. 3b is a waveform diagram indicating the input and output signals of the electrical circuit shown in FIG. 3a;

FIG. 5 is a block diagram illustrating an electronic processing unit which is a single-chip microcomputer connected to the fluid flow meter shown in FIGS. 1a–1c and which counts the time of delay at the start of the current flowing through an electrical coil relative to the pulse voltage impressed on the electrical coil of the fluid flow meter;

DETAILED DESCRIPTION OF THE PREFERRED EMBODIMENTS

Figure 1A:
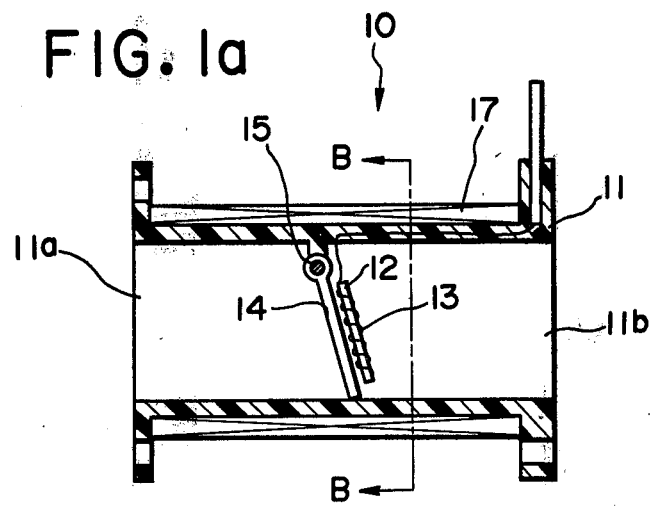
FIG. 1a is a vertical sectioned view of the fluid flow meter according to an embodiment of the present invention.
Figure 1B:
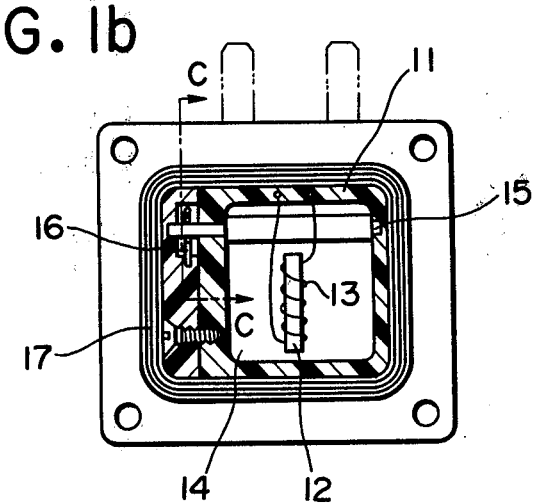
Figure 1C:
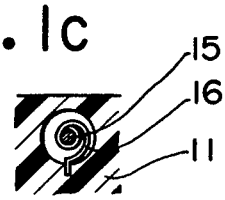
FIG. 1c is a fragmentary sectional view taken along line C—C of FIG. 1b.

In the embodiment shown in FIGS. 1a–1c, the fluid flow meter 10 can be provided, for instance, in a passage in the intake manifold of a vehicle engine or in the passage for the super-charged air for a turbocharger to measure the flow rate of the fluid flowing through the passage and to adjust the volume of injected fluid. The body 11, made of a plastic material, supports one end of a movable member 14 with the detecting part fixed thereto between inlet 11a and outlet 11b for the fluid. The detecting part includes a magnetically soft member 12 wound with a coil 13. The magnetically soft member 12 is a thin plate when it is made of amorphous magnetic material because it is made by quickly quenching the liquid phase metal. Several of the thin plates are stacked one upon another to provide the magnetic member. The amorphous magnetic members described later in Table 1 are comprised of five stacked plates.

When the coil wound around the magnetic member is impressed with a specified voltage, the time T, from the starting point of impressing the voltage to the magnetic saturation of the magnetically soft member, will vary depending on the length of projection of the magnetic member in the direction parallel to the magnetic flux. This variation can be taken out in the form of an electrical signal. The longitudinal direction of the magnetically soft member 12 is vertical to a pivoting axis 15 of the movable member 14. At the pivoting point 15 of the movable member 14, as shown in FIG. 1b and FIG. 1c, a spiral spring 16, fixed at one end to the pivoting axis 15 and at the other end to the body 11, is wound up and exerts a biasing force to constantly press the movable member 14, integal with the axis 15, in the direction of throttling the passage. Because of this arrangement, the displacement value of the movable member 14 in the direction of opening the passage corresponds to the flow rate of the fluid in the passage. On the outer circumference of the body 11 is wound a solenoid 17 extending an equivalent amount to the right and to the left of the pivoting point 15. By supplying the solenoid 17 with a constant electric current, a magnetic flux parallel to the direction of fluid flow in the body 11 is formed.

When the fluid flows into the inlet 11a of the body 11, the movable member 14 swings around the pivoting point 15 in proportion to the amount of dynamic pressure caused by the fluid. The swinging movement of the movable member continues to the position in which the dynamic pressure by the fluid balances with the tension given by the spiral spring 16. In response to the pivotal movement of the movable member 14, the amount of magnetic flux generated by the solenoid 17 and passing through the inside of the magnetically soft member 12, in the direction of fluid flow, will vary. The tilting amount of the movable member 14, i.e., the flow rate of the fluid, will be detected by the electrical circuit 100 or 120 or the logical electronic device 160 shown in FIGS. 2a, 3a and 5, respectively.

Although in this embodiment, the direction of magnetic flux generated by solenoid 17 is in parallel with the direction of fluid flow, such magnetic flux direction may be changed to be vertical or slanting to the direction of fluid flow, so long as the amount of magnetic flux passing through the inside of the magnetically soft member 12 is variable in response to the movement of the movable member 14, i.e., in response to the flow rate of the fluid.

A magnetically soft material exhibiting high permeability ($\mu$max$>10^3$) and low coercive force ($>1.0$ Oe) is used in this invention. (Some magnetically soft materials are described in *Hasegawa et al*, "Soft Magnetic Properties of Metallic Glasses—Recent Developments", J. Appl. Phys. 50(3), March, 1979, pp. 1551-1556. Magnetically soft materials are sold under the trademark METGLAS (TM) by Allied Chemical Corp.).

FIG. 2a shows an electrical processing circuit 100. In the circuit 100, the constant voltage power source terminal 101 is impressed with direct current voltage (for example +5 V) of a predetermined level. The input terminal 102 is impressed with a voltage pulse of for example 5~23 KHz and thereby NPN transistor 103 is energized in the positive voltage range of the voltage pulse and the NPN transistor 103 is deenergized in the range of ground level. The PNP transistor 104 is ON while the transistor 103 is ON, and OFF while the transistor 103 is OFF. Therefore, the electrical coil 13 is impressed with a constant voltage (Vcc) during the positive level of the voltage pulses impressed to the input terminal 102 and is not applied with voltage during the ground level. The resistor 105 has applied thereto a voltage proportional to the current flowing through the coil 13 and this voltage is integrated at the integrating circuit consisting of the resistor 106 and capacitor 107 and the integrated voltage appears at the output terminal 108.

FIG. 2b illustrates the waveforms of the input and output voltages in the circuit shown in FIG. 2a. The time td from the input voltage (IN) going up to a positive level, to the voltage of the resistor 105 going up higher than a certain level and the integrated voltage Vx of the resistor 105 will correspond to the position of the magnet 14.

Figure 3A:
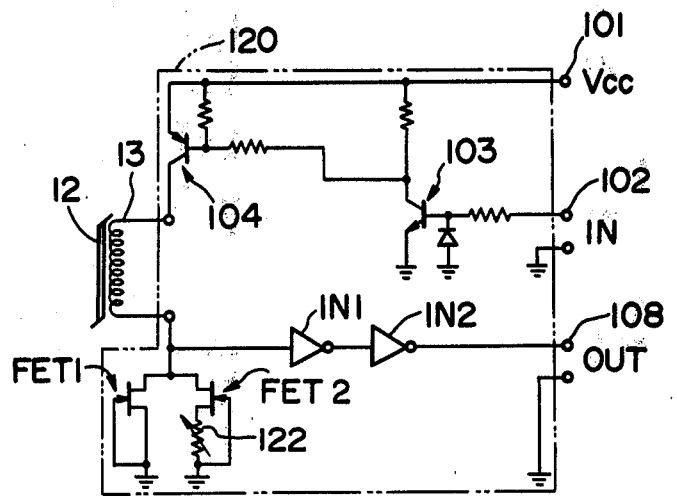
FIG. 3a is a circuit diagram of an electrical circuit which is connected to the fluid flow meter and which generates a time differential pulse corresponding to the detected flow rate.

FIG. 3a sets forth another electrical processing circuit 120. While the input voltage (IN) is in the positive level, NPN transistor 103 is ON and PNP transistor 104 is OFF whereby the coil 13 will not be impressed with the voltage. While the input voltage (IN) is at the ground level, the transistor 103 is OFF, and the PNP transistor 104 is ON.

The coil current flows into the jointed N channel construction FET 1 and FET 2, connected with the constant current, and will be controlled to the specified level by FET 1 and FET 2. The level of the current flowing through FET 2 will be established by the variable resistor 122. The voltage at the coil terminal connected to FET 1 and FET 2 will be amplified and formed into waveforms by the inverted amplifiers IN 1 and IN 2.

Figure 3B:
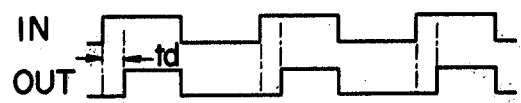

FIG. 3b shows the waveforms of the input and the output voltages in the circuit shown in FIG. 3a. The outout (OUT) of the circuit 120 is a voltage pulse which rises a delay time td after the input (IN) and this delay time td corresponds to the position of the magnet 14.

Figure 4:
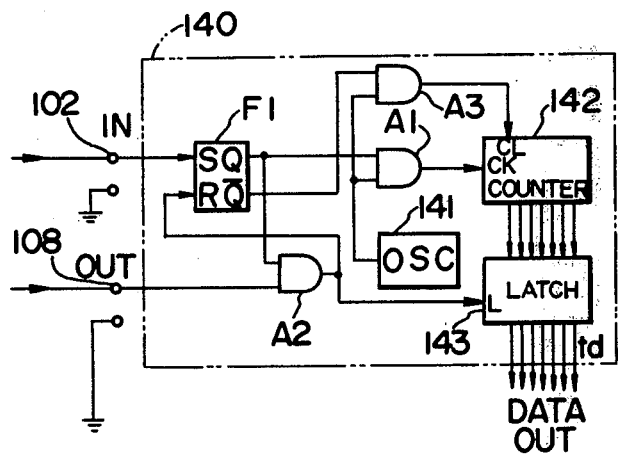
FIG. 4 is a block diagram illustrating a counter circuit which transforms the time differences td of the input and output pulses of the electrical circuit shown in FIG. 3a into digital codes.

The time delay td is indicated in the form of digital codes in the circuit 140 of FIG. 4. In the circuit 140, with the rising of the input voltage (IN), the flip-flop F1 is set and the Q output thereof will be at the high level [1] and AND gate A1 will be opened (ON) and the clock-pulse oscillator 141 will generate a pulse which is impressed on the count-pulse input terminal CK of the counter 142. The output pulse (OUT) and the Q output of flip-flop F1 are impressed to the AND gate A2 and when the output pulse (OUT) rises, AND gate A2 will rise to the high level [1] and at the rising point thereof the flip-flop F1 is reset and the Q output thereof will go down to the low level [0]. With this operation, AND gate Al will be closed (OFF) and the clock pulse to the counter 142 will be interrupted. When the output of AND gate goes to [1], the counting codes of the counter 142 will input the latch 143. After the flip-flop F1 has been reset and the counting codes have input the latch 143, AND gate A3 feeds the clock pulse and clears the counter 142. The output codes of the latch will indicate the generated number of clock pulses during td whereby the codes will indicate td.

The electronic processing unit 160 shown in FIG. 5 comprises single-chip microcomputer (large scale integrated semiconductive device) 161, amplifier 162, the jointed N-channel construction FET 1 for controlling the constant current, resistor 163, capacitor 164, amplifier 165 and clock pulse oscillator 166. The resistor 163 and the capacitor 164 comprise a filter which absorbs voltage vibration of higher frequency than that of the output and input pulses. The microcomputer 161 forms pulses of a specified frequency, based on the clock pulses in the range from 5 KHz–30 KHz, and feeds them to the amplifier 162. On the other hand, the microcomputer 161 observes the voltage at the connecting point of N-channel FET 1 with one end of the coil 13 (the output voltage of the amplifier 165). The microcomputer 161 also counts the clock pulses in the time delay (td)-from the rising point of the pulse that the microcomputer 161 has itself supplied, to the rising point of the output voltage supplied by the amplifier 165 - and produces codes designating the time delay td (DATA OUT).

As described above, various kinds of electrical processing circuits and logic processing electronic devices are connected to the fluid flow meter 10 shown in FIG. 1 so that the electrical signals corresponding to the tilting angles of the movable member 14, in the fluid flow meter 10, can be obtained. It will now be explained how the electrical signals corresponding to the flow rate of the fluid can be obtained in the fluid flow meter 10 and the above described electrical processing circuits 100, 120, 140 or the logic processing device 160. Firstly, the flow rate of the fluid which has entered through the inlet 11a of the fluid flow meter 10 will cause dynamic pressure against the tension of the spiral spring 16 and this dynamic pressure will be transformed into the tilting angle $\theta$ of the movable member 14. Then, the tilting angle $\theta$, of the movable member 14, will be transformed into an electrical signal.

Figure 6A:
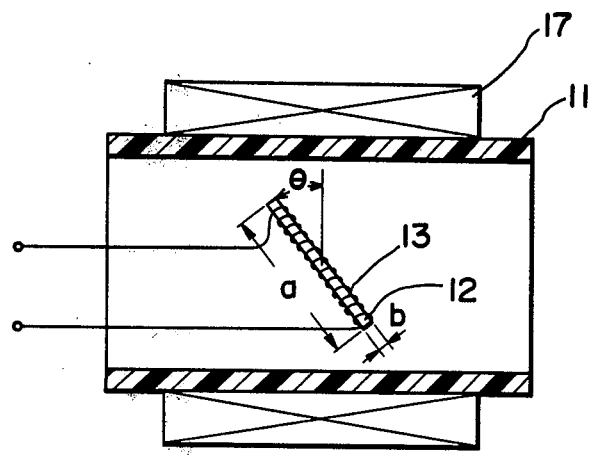
FIG. 6a is an explanative and sectioned view of a fluid flow meter showing the relative position of the magnetically soft member and the magnetic flux when the time difference td of pulses corresponding to the tilting angle of the magnetically soft member is obtained.

The foregoing transformation of $\theta$ into an electrical signal is further described with reference to the data shown in FIG. 6b and FIG. 6C. In FIG. 6a, the magnetically soft member 12 is pivotably secured and a solenoid 17 is provided surrounding the magnetic member 12. A specified amount of electric current is supplied to the solenoid 17 to generate a specified amount of magnetic flux. Having determined that the longitudinal direction of the magnetically soft member could vary from the direction substantially vertical to the magnetic flux ($\theta=0°$) to the direction horizontal thereto ($\theta=90°$), the tilting angle $\theta$ of the magnetically soft member is varied as in FIG. 6a and V($\theta$) and td, corresponding to the variation of the tilting angle, are measured. The dimensions a,b showing the shape and the relative arrangement and the corresponding relation between the material of the magnetically soft member, etc., and data obtained by measurement are shown in Case No. 1 and Case No. 2 in the following Table 1.

TABLE 1

Figure 6C:
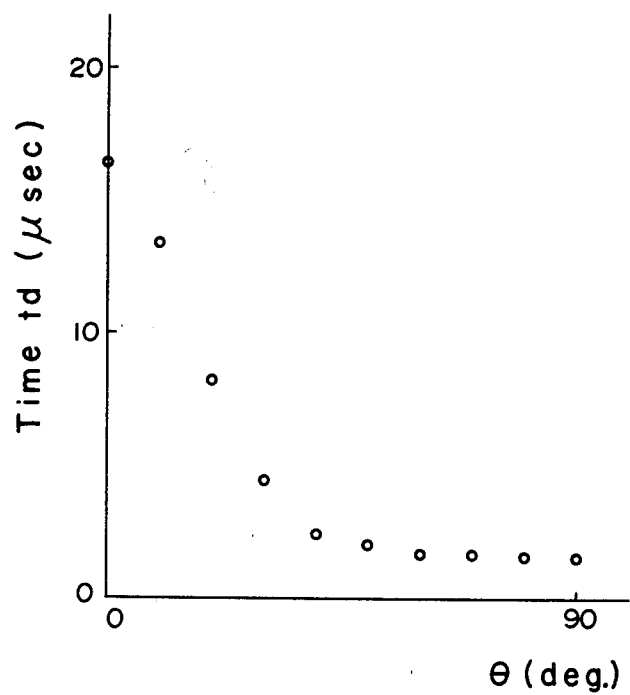
FIG. 6c is a graph illustrating the time difference td between the input and the output pulses, obtained by measuring the waveforms of the input and output pulses, through observation with a synchroscope when in the disposition shown in FIG. 6a the magnetically soft member has been rotated around its pivot point and the electrical circuit shown in FIG. 3a has been connected to the coil of the meter.
Figure 6B:
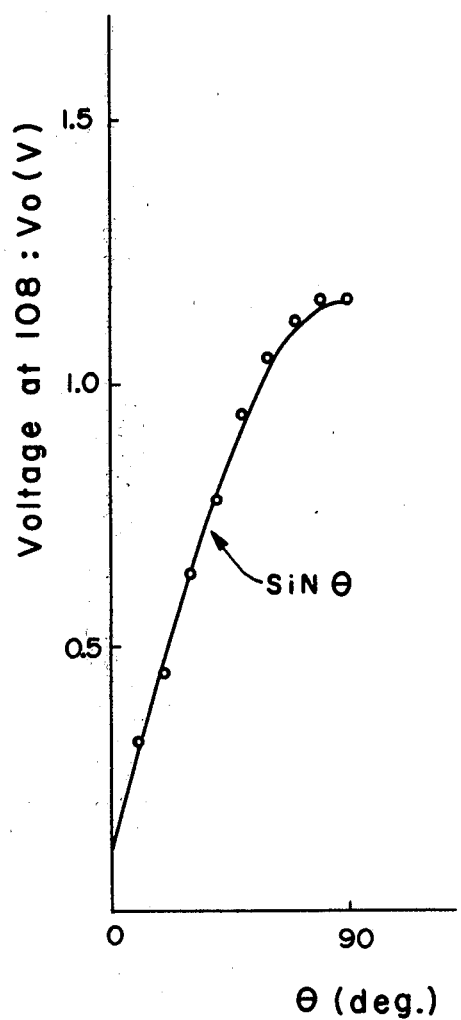
FIG. 6b is a graph illustrating the indicated voltage V relative to the tilting angle $\theta$ of the magnetically soft member when in the disposition shown in FIG. 6a, the magnetically soft member has been rotated around its pivot point and the electrical circuit shown in FIG. 2a has been connected to the electrical coil of the meter.

| Case No. | Soft magnetic member 12 | | | | | Coil 13 | Solenoid 17 | | | | Method of measurement | |
|---|---|---|---|---|---|---|---|---|---|---|---|---|
| | Material Atomic wt % | Thick mm | a mm | b mm | No. of plates | No. of turns | No. of winding | Inner dia m | Current Amp | Length of coil mm | input pulse frequency | Data |
| 1 | Fe*Ni P B 40 40 14 6 | 0.058 | 30 | 1.8 | 5 | 1,000 | 1,600 | 48 | 1 | 60 | Circuit 100 5 KHz | FIG. 6b |
| 2 | Fe*Ni P B | " | " | " | 5 | 1,000 | " | " | " | " | Circuit 120 | FIG. 6c |

TABLE 1-continued

| Case No. | Soft magnetic member 12 | | | | | Coil 13 | Solenoid 17 | | | | Method of measurement | |
| --- | --- | --- | --- | --- | --- | --- | --- | --- | --- | --- | --- | --- |
| | Material Atomic wt % | Thick mm | a mm | b mm | No. of plates | No. of turns | No. of winding | Inner diam | Current Amp | Length of coil mm | input pulse frequency | Data |
| | 40 40 14 6 | | | | | | | | | | 5 KHz | |

*amorphous

From Case No. 1, it can be observed, through the data shown in FIG. 6b, that as the tilting angle θ of the magnetically soft member 12 varies from 0 through 90 degrees, a voltage curve V(θ) substantially similar to a sine curve which gradually increases according to the above variation can be obtained. From Case No. 2, it can be seen that a similar curve of time td can be obtained which gradually decreases toward a certain value as the tilting angle θ of the magnetically soft member 12 varies from 0 through 90 degrees.

In the aforementioned embodiment, the magnetically soft member 12 is comprised of several amorphous magnetic materials stacked one upon another which have high magnetic permeabiity and flexibility and less deformation property. According to the present invention, however, other kinds of magnetic materials can be used for the magnetically soft member. Some of the examples are mu-metal (alloy comprising 80 percent atomic weight of nickel, 16 percent atomic weight of Fe and 4 percent atomic weight of Mo) or super parmaloy (comprising 80 atomic percent weight of Ni and 20 percent atomic weight of Fe) etc. and these Ni-Fe alloys can make it possible to obtain substantially equivalent properties as those from the magnetic materials. It is preferable, however, that the above-mentioned amorphous magnetic member be used for purposes of this invention since it has high resistance against vibration and deformation.

Furthermore, although a solenoid has been used as the means for generating the magnetic field in the present embodiment, it will be easily understood that a permanent magnet can be substituted therefor.

As understood from the above, the fluid flow meter according to the present invention has no abrasive contact, provides high vibration resistance since the tilting angle of the movable member, corresponding to the flow rate of the fluid, is transformed into the time difference td between the input pulse of the electrical coil and current pulse energizing the electrical coil. The pressure detection signal can be obtained through electrical processing capable of counting the time difference td in the form of an analog voltage or time count codes and provides stable flow rate detection because mechanical deterioration such as abrasion can be reduced. There are no connecting mechanisms between the movable member and the transducer causing mechanical looseness. Furthermore, it should be noted that the connection of the electrical processing circuit to the sensor is simple and in particular, that the pulse for pressure detection can be formed by a large scale integrated semiconductive device such as a single-chip microcomputer and that the time difference between the above-mentioned pressure detection pulse and the current detection pulse, energizing the electrical coil, can be easily obtained in the form of digital codes.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A fluid flow meter comprising:
   a body means having a passage therein for the fluid to flow therethrough;
   a movable member provided in said passaage in said body means and movable to open and close said passage in response to the flow rate of the fluid flowing through said passage;
   a magnetically soft member fixed onto said movable member and wound with a coil;
   a magnetic field generating means provided on said body means and adapted to generate magnetic flux in a range in which said movable member is movable, said magnetically soft member changing its orientation with respect to the magnetic flux produced by said magnetic field generating means in dependence on the movement of said movable member; and
   detection means for applying a predetermined pulse voltage to said coil to saturate said magnetically soft member and for detecting changes in the magnetic flux provided by said magnetic field generating means coupling said magnetically soft member in accordance with movement of said movable member, comprising means for producing an output signal indicative of the fluid flow based on the time between application of said pulse voltage and saturation of said magnetically soft member.

2. A fluid flow meter as in claim 1 wherein, said movable member is connected to a biasing means which constantly biases said movable member in the closing direction of said passage.

3. A fluid flow meter as in claim 2 wherein, said biasing means is a spiral spring.

4. A fluid flow meter as in claim 1 wherein, said magnetically soft member is an amorphous magnetic material.

5. A fluid flow meter as in claim 1 wherein, said magnetic field generating means is a solenoid.

6. A fluid flow meter comprising:
   a body means having a passage therein for the fluid to flow therethrough;
   a movable member provided in said passage in said body means and adapted to tilt to open and close said passage in response to the flow rate of the fluid flowing through said passage;
   a magnetically soft member fixed onto said movable member and wound with a coil; and
   a magnetic field generating means provided on said body means and adapted to generate magnetic flux parallel to the flow direction of said fluid.

7. A fluid flow meter as in claim 6 wherein, said magnetically soft member is of amorphous magnetic material.

8. A fluid flow meter as in claim 6 wherein, said magnetically soft member on said movable member is so provided that the longitudinal direction thereof is arranged substantially vertical to a pivoting axle on which said movable member is able to tilt.

9. A fluid flow meter comprising:
a body means having a passage therein for the fluid to flow therethrough;
a movable member provided in said passage in said body means, said movable member being pivotably secured to said body means at one end and adapted to tilt to open and close throttle of said passage which corresponds to the flow rate of the fluid flowing through said passage;
a biasing means adapted to constantly bias said movable member in the direction of throttling said passage;
a magnetically soft member fixed onto said movable member and wound with coils; and
a solenoid means wound on said body means and adapted to generate magnetic flux parallel to the flow direction of said fluid.

10. A fluid flow meter as in claim 9, wherein, said biasing means is a spiral spring.

11. A fluid flow meter comprising:
a body means having a passage therein for the fluid to flow therethrough;
a movable member pivotably mounted in said passage in said body means and tiltable to open and close said passage in response to the flow rate of the fluid flowing through said passage;
a magnetically soft member fixed onto said movable member and wound with a coil; and
a magnetic field generating means provided on said body means and adapted to generate magnetic flux in a predetermined direction in a range in which said movable member is tiltable.

12. A fluid flow meter according to claim 6, 9 or 11, further comprising:
detection means for applying a predetermined pulse voltage to said coil to saturate said magnetically soft member and for detecting changes in the magnetic flux provided by said magnetic field generating means coupling said magnetically soft member in accordance with tilting movement of said movable member, comprising means for producing an output signal indicative of the fluid flow based on the time between application of said pulse voltage and saturation of said magnetically soft member.

* * * * *